(12) United States Patent
Choi et al.

(10) Patent No.: US 11,363,328 B2
(45) Date of Patent: Jun. 14, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Jeonghye Choi, Suwon-si (KR); Changseog Ko, Suwon-si (KR); Soungmin Yoo, Suwon-si (KR); Jae Julien, Suwon-si (KR); Yoojin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/104,341

(22) Filed: Nov. 25, 2020

(65) Prior Publication Data
US 2021/0168431 A1 Jun. 3, 2021

(30) Foreign Application Priority Data

Nov. 28, 2019 (KR) ........................ 10-2019-0155321

(51) Int. Cl.
*H04N 21/431* (2011.01)
*H04N 5/14* (2006.01)
(Continued)

(52) U.S. Cl.
CPC ......... *H04N 21/4312* (2013.01); *H04N 5/144* (2013.01); *H04N 5/445* (2013.01);
(Continued)

(58) Field of Classification Search
CPC .......... H04N 21/4532; H04N 21/4312; H04N 5/144; H04N 5/445; H04N 5/607; H04R 5/00; H04R 5/02; H04R 2499/15
See application file for complete search history.

(56) References Cited

U.S. PATENT DOCUMENTS 7,532,253 B1 * 5/2009 Greenberg ............... H04N 5/45
348/563
7,831,102 B2 11/2010 Yang
(Continued)

FOREIGN PATENT DOCUMENTS

JP 2004-297644 10/2004
JP 2007-150920 6/2007
(Continued)

OTHER PUBLICATIONS

International Search Report dated Apr. 7, 2021 in international Patent Application No. PCT/KR2020/016678.

*Primary Examiner* — Jason R Kurr
(74) *Attorney, Agent, or Firm* — Staas & Halsey LLP

(57) ABSTRACT

The disclosure is to provide a display apparatus capable of increasing user convenience by outputting a screen and a sound under predetermined conditions when outputting a split screen, and a method of controlling the display apparatus. The display apparatus of the disclosure includes a speaker; a display; and in response to input of an output command for outputting the plurality of contents to the plurality of regions of the display, a controller configured to output image signals of a plurality of contents to a plurality of regions, and to output sound signals of the plurality of contents to the speaker. Sizes of the plurality of regions and an output intensity of the sound signal corresponding to the plurality of contents are configured to be determined based on priority information predetermined based on the plurality of contents.

29 Claims, 12 Drawing Sheets

(51) Int. Cl.
*H04N 5/60* (2006.01)
*H04N 5/445* (2011.01)
*H04R 5/00* (2006.01)
*H04R 5/02* (2006.01)

(52) U.S. Cl.
CPC ............... *H04N 5/607* (2013.01); *H04R 5/00* (2013.01); *H04R 5/02* (2013.01); *H04R 2499/15* (2013.01)

(56) References Cited

U.S. PATENT DOCUMENTS

| | | | |
|---|---|---|---|
| 2007/0177743 A1* | 8/2007 | Mertens | H04N 21/4622 381/107 |
| 2012/0131627 A1* | 5/2012 | Chittella | H04N 21/4621 725/109 |
| 2014/0085360 A1 | 3/2014 | Ohno et al. | |
| 2014/0295959 A1 | 10/2014 | Osada | |
| 2015/0113568 A1 | 4/2015 | Lee | |
| 2016/0111039 A1* | 4/2016 | Iwami | H04N 21/4436 345/520 |

FOREIGN PATENT DOCUMENTS

| KR | 10-2015-0046833 | 5/2015 |
|---|---|---|
| KR | 10-2015-0054190 | 5/2015 |
| KR | 10-2016-0055553 | 5/2016 |

\* cited by examiner

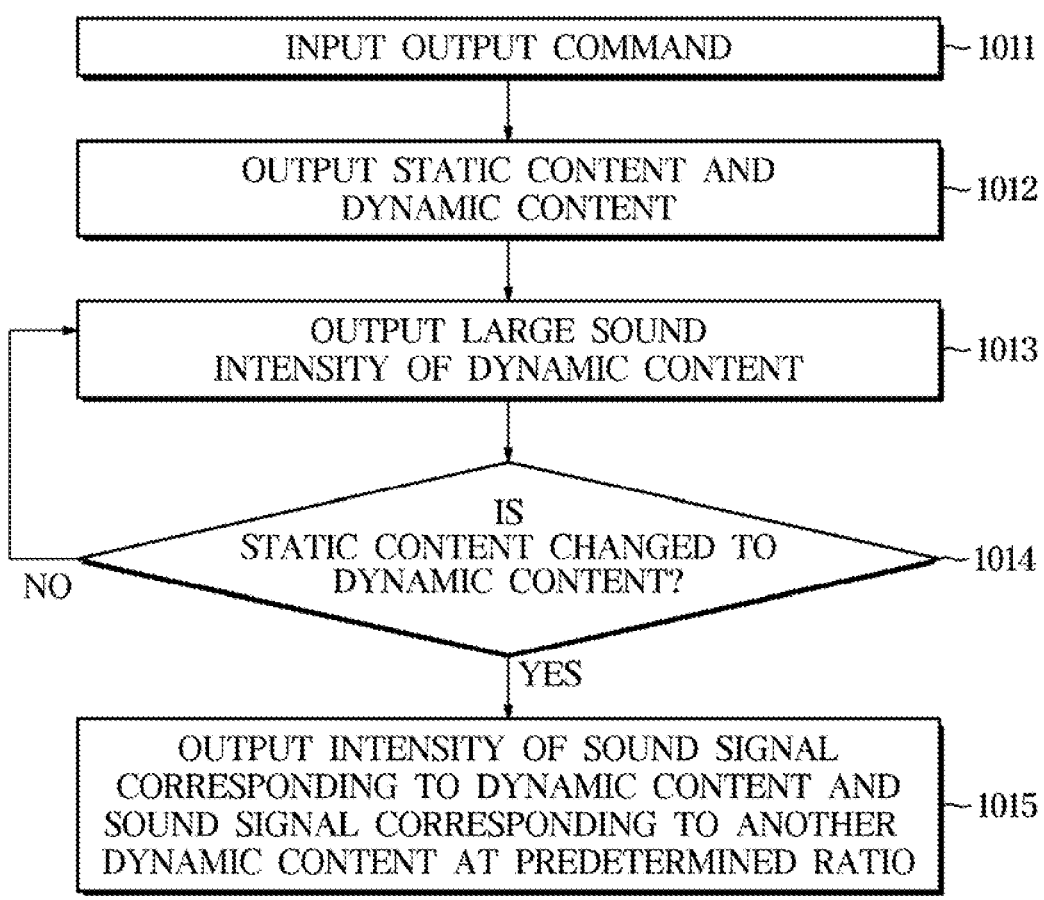

DISPLAY APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0155321, filed on Nov. 28, 2019 in the Korean Intellectual Property Office, the disclosure of which is incorporated by reference in its entirety.

BACKGROUND

Field

The disclosure relates to a display apparatus that that outputs a split screen, and a method of controlling the same.

Description of Related Art

With a development of electronic technology, various types of electronic devices have been developed and distributed. In particular, in a case of TV, it is possible to provide a three-dimensional (3D) content or a content with a higher resolution. Accordingly, in broadcasting technology, contents including a plurality of images such as the 3D content, a multi-angle content, a content including a depth image are provided.

Recent display apparatuses may also provide UHD-quality content. In addition, as a display screen becomes larger, the entire display screen may be divided and various contents may be simultaneously displayed on each divided screen.

On the other hand, when setting a split screen, a user manually operated a screen layout and volume desired to watch after selecting a desired content based on a basic setting state.

Therefore, a research is required to make the operation more convenient.

SUMMARY

In accordance with an aspect of the disclosure, a display apparatus may include a speaker; a display; and in response to input of an output command for outputting the plurality of contents to the plurality of regions of the display, a controller configured to output image signals of a plurality of contents to a plurality of regions, and to output sound signals of the plurality of contents to the speaker. Sizes of the plurality of regions and an output intensity of the sound signal corresponding to the plurality of contents may be configured to be determined based on priority information predetermined based on the plurality of contents.

The controller may be configured to determine the predetermined priority information based on at least one of types of the plurality of contents and a user's preference for the types of the plurality of contents.

The controller may be configured to determine the predetermined priority information based on at least one of genres of the plurality of contents and a user's preference for the genres of the plurality of contents.

The controller may be configured to determine the predetermined priority information based on a pre-input user's command.

The controller may be configured to store information about a user's content usage history, and to determine the predetermined priority information based on the information about the content usage history.

The controller may be configured to receive the plurality of contents through a plurality of sources, and to determine the predetermined priority information based on the plurality of sources.

After inputting the output command, the controller may be configured to change the sizes of the plurality of regions corresponding to the plurality of contents based on a control command for changing the sizes of the plurality of regions.

After inputting the output command, the controller may be configured to change the output intensity of the sound signal corresponding to the plurality of contents based on a control command for changing the output intensity of the sound signal.

The controller may be configured to change the output intensity of the sound signal of the content based on the size of each of the plurality of regions.

One of the plurality of contents may be a dynamic content including a dynamic image. Another content of the plurality of content may be a static content including a static image. The controller may be configured to output the dynamic content and the static content, and to output the output intensity of the sound signal corresponding to the dynamic content greater than the output intensity of the sound signal corresponding to the static content.

In response to the static content being converted to the other dynamic content, the controller may be configured to output the output intensity of the sound signal corresponding to the dynamic content and the output intensity of the sound signal corresponding to the other dynamic content at a predetermined ratio.

The controller may be configured to receive an external content from an external device, to determine a size of a region in which the external content is output based on a priority determined corresponding to the external device and output the external content to the display, and to output the sound signal of the external content to the speaker based on the priority determined in correspondence with the external device.

The external device may be provided as a CAM. The controller is configured to turn off the sound signal of the external content corresponding to the external device.

The controller may be configured to turn on the sound signal of the external content corresponding to the external device in response to the external device detecting a motion exceeding a reference value.

In response to the case where the priority of an existing content output before the output command is input and a new content output after the output command is input are the same, the controller may be configured to output the sound signal of the existing content and the sound signal of the new content to the speaker at a predetermined ratio.

In accordance with another aspect of the disclosure, a method of controlling a display apparatus may include, in response to input of an output command for outputting the plurality of contents to the plurality of regions of the display, outputting, by a controller, image signals of a plurality of contents to a plurality of regions; and outputting, by the controller, sound signals of the plurality of contents to the speaker. Sizes of the plurality of regions and an output intensity of the sound signal corresponding to the plurality of contents may be configured to be determined based on priority information predetermined based on the plurality of contents.

The determining of the predetermined priority information may include determining the predetermined priority information based on at least one of types of the plurality of contents and a user's preference for the types of the plurality of contents.

The determining of the predetermined priority information may include determining the predetermined priority information based on at least one of genres of the plurality of contents and a user's preference for the genres of the plurality of contents.

The determining of the predetermined priority information may include determining the predetermined priority information based on a pre-input user's command.

The determining of the predetermined priority information may include storing information about a user's content usage history; and determining the predetermined priority information based on the information about the content usage history.

The determining of the predetermined priority information may include receiving the plurality of contents through a plurality of sources; and determining the predetermined priority information based on the plurality of sources.

The method may further include, after inputting the output command, changing, by the controller, the sizes of the plurality of regions corresponding to the plurality of contents based on a control command for changing the sizes of the plurality of regions.

The method may further include, after inputting the output command, changing, by the controller, the output intensity of the sound signal corresponding to the plurality of contents based on a control command for changing the output intensity of the sound signal.

The method may further include changing, by the controller, the output intensity of the sound signal of the content based on the size of each of the plurality of regions.

One of the plurality of contents may be a dynamic content including a dynamic image. Another content of the plurality of content may be a static content including a static image. The method may further include outputting, by the controller, the dynamic content and the static content; and outputting, by the controller, the output intensity of the sound signal corresponding to the dynamic content greater than the output intensity of the sound signal corresponding to the static content.

The method may further include, in response to the static content being converted to the other dynamic content, outputting, by the controller, the output intensity of the sound signal corresponding to the dynamic content and the output intensity of the sound signal corresponding to the other dynamic content at a predetermined ratio.

The method may further include, receiving, by the controller, an external content from an external device; determining, by the controller, a size of a region in which the external content is output based on a priority determined corresponding to the external device and output the external content to the display; and outputting, by the controller, the sound signal of the external content to the speaker based on the priority determined in correspondence with the external device.

The external device may be provided as a CAM. The outputting of the sound signal of the external content to the speaker may include turning off the sound signal of the external content corresponding to the external device.

The outputting of the sound signal of the external content to the speaker may include turning on the sound signal of the external content corresponding to the external device in response to the external device detecting a motion exceeding a reference value.

The method may further include, in response to the case where the priority of an existing content output before the output command is input and a new content output after the output command is input are the same, outputting, by the controller, the sound signal of the existing content and the sound signal of the new content to the speaker at a predetermined ratio.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 11 and 12 are flowcharts according to an embodiment.

DETAILED DESCRIPTION

Figure 1:
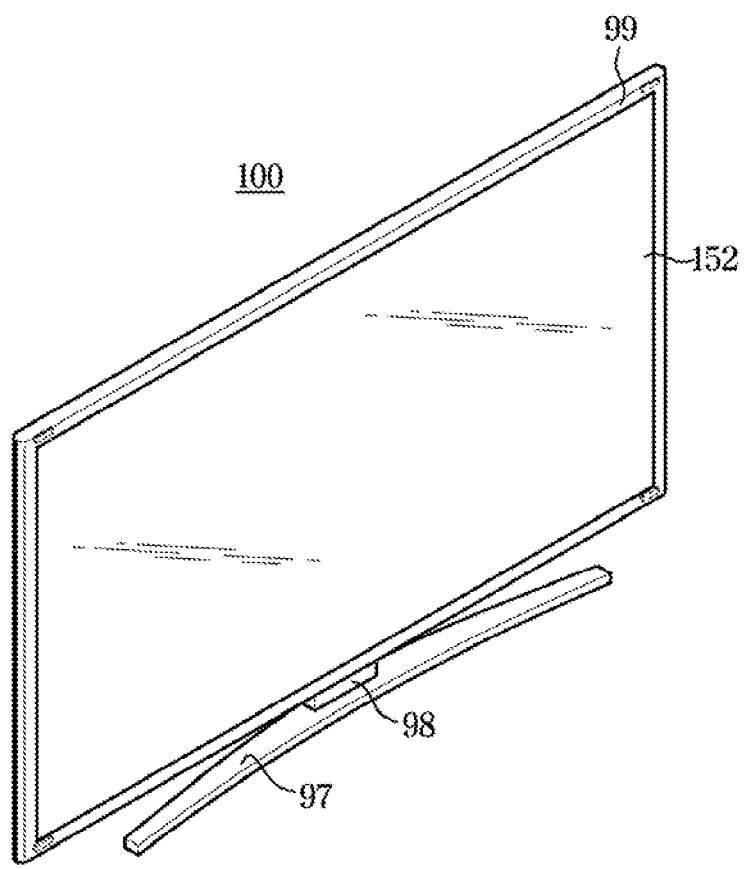
FIG. 1 is an external view illustrating a display apparatus according to an exemplary embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

An aspect of the disclosure is to provide a display apparatus capable of increasing user convenience by outputting a screen and a sound under predetermined conditions when outputting a split screen, and a method of controlling the display apparatus.

Hereinafter, an operation principle and embodiments of the disclosure will be described with reference to accompanying drawings.

FIG. 1 is an external view illustrating a display apparatus according to an exemplary embodiment.

Referring to FIG. 1, a display apparatus 100 according to an embodiment may include an exterior housing 99, a display panel 152, a support 98, and a leg 97.

The exterior housing 99 defines an exterior appearance of the display apparatus 100 and includes components of the display apparatus 100 used to display various images or perform various functions. The exterior housing 99 may be formed as a single piece or as a combination of a plurality of housings, e.g., a combination of a front housing and a rear housing. An intermediate housing may further be provided inside the exterior housing 99.

The display panel 152 may be provided on the front surface of the exterior housing 99 and display various images. Particularly, the display panel 152 may display at least one or more still images or moving images. The display panel 152 may also be implemented using separate components such as a touch panel, depending on an embodiment.

The support 98 serves to connect the exterior housing 99 with the leg 97 while supporting the exterior housing 99. The support 98 may have various shapes according to designer's selection or may be omitted, depending on an embodiment. The support 98 may be attached to or detached from the exterior housing 99, depending on an embodiment.

The leg 97 may be connected to the support 98 such that the exterior housing 99 is stably mounted on the floor. The leg 97 may be coupled to or separated from the support 98, depending on an embodiment. The leg 97 may be directly connected to the exterior housing 99. According to another exemplary embodiment, the leg 97 may be omitted.

Figure 2:
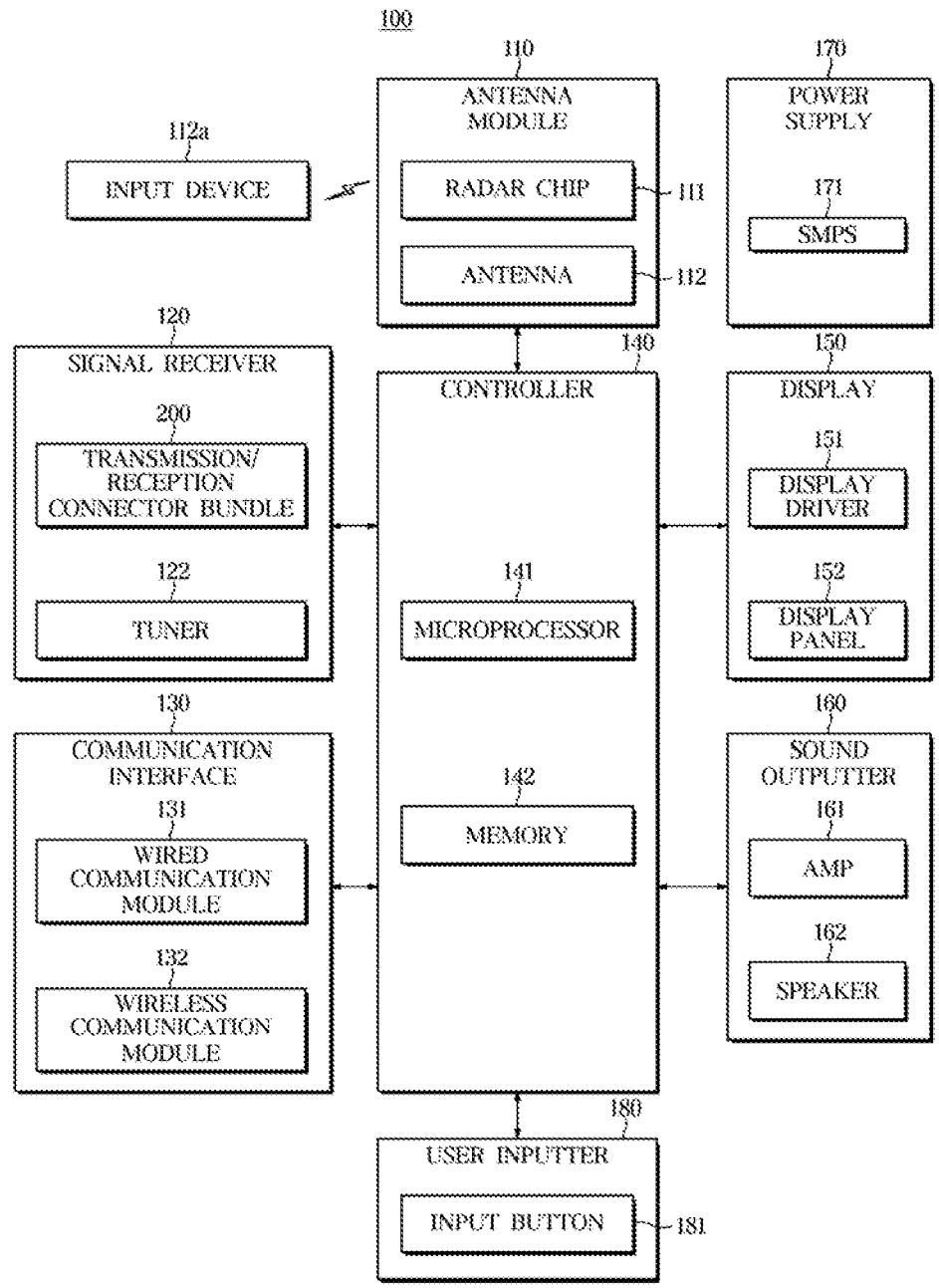
FIG. 2 is a control block diagram of a display apparatus according to an embodiment.

FIG. 2 is a control block diagram of a display apparatus according to an embodiment.

Referring to FIG. 2, the display apparatus 100 may include an antenna module 110 to receive a signal from an input device 112a, a user inputter 180 to receive a user's input from a user, a communication interface 130 (e.g., a transceiver) to communicate with an external device 130, a controller 140 to control the operation of the display apparatus 100 and process video signals and/or audio signals received from a signal receiver 120 and/or the communication interface 130, a display 150 to display an image processed by the controller 140, a sound outputter 160 to output sound processed by the controller 140, and a power supply 170 to supply power to the components of the display apparatus 100.

Meanwhile, the user may input an output command for outputting a content to a divided region on the display apparatus 100 through the user inputter 180.

In addition, even after inputting the output command, the user may individually input a control command to control a size of a region in which the corresponding content is output or an output of a sound signal.

The antenna module 110 may include a radar chip 111 capable of transmitting and receiving a signal composed of a specific pulse component of a predetermined frequency band.

The display apparatus 100 may receive a user input regarding a change of an image source device 120 or 130 through an antenna 112.

When the output command for outputting a plurality of contents is input to each of a plurality of regions, the controller 140 may determine a size of each of the plurality of regions in which the plurality of contents are output based on a predetermined priority of the plurality of contents.

The output command referred to herein may mean a command or instruction for controlling the plurality of contents to be simultaneously output on one display.

Meanwhile, the priority of the corresponding content may be determined in advance, and the priority may refer to the size of the corresponding content determined when simultaneously outputting to the display apparatus 100 and a variable for outputting the sound signal of the corresponding content.

The controller 140 may output the plurality of contents on the display in the size of each of the plurality of regions. The region in which the content is output may be determined based on the above-described priority.

Also, the controller 140 may output each sound signal of the plurality of contents to a speaker 162 based on the priority of the plurality of contents. A detailed operation of the controller 140 determining the size of the content based on the priority and outputting the sound signal will be described later.

When the control command is input at a time point after the output command is input, the controller 140 may output the plurality of contents to the display based on the control command.

That is, at the time when a plurality of split screens are output, the controller 140 may output the screen and the sound with the stored priority, but the display apparatus 100 may then perform an operation of outputting the screen in response to a command of the user when the user inputs a command to control the size of the screen and an intensity of the sound signal.

When the control command is input at the time point after the output command is input, the controller 140 may output each sound signal of the plurality of contents to the speaker 162 based on the control command.

That is, the sound signal may also be output based on the user's control command after a split screen output command.

The controller 140 may output the sound signal of the content based on the size of each of the plurality of regions.

The controller 140 may output the sound signal in proportion to the displayed screen.

Meanwhile, the content may include content including a dynamic image and content including a static image.

The dynamic image may refer to a video. On the other hand, the static image may refer to a still image without motion, such as a photograph.

The controller 140 may output the dynamic image and the static image, and may output the sound signal corresponding to the dynamic image and the sound signal corresponding to the static image at a predetermined ratio. In general, since the static image does not include the sound signal, the controller 140 may reduce the output of the sound signal of the content including the static image.

When the static content is converted to another dynamic content, the sound signal corresponding to the dynamic content and the sound signal corresponding to the other dynamic content may be output at different predetermined ratios. That is, when the dynamic image is output from the static image, the video or the like may be output. In this case, since the sound is often included in the content, it is possible to increase the output of the sound signal even for the content including the static image.

The controller 140 may receive external content from the external device, and may output the external content to the display 150 by determining the size of the region in which the external content is output, based on the priority determined in correspondence with the external device.

In addition, the controller 140 may output the sound signal of the external content to the speaker 162 based on the priority determined in correspondence with the external device.

The external device may refer to a device that is connected to the display 150 or communicates with the display apparatus 100, not a signal received by the display 150 itself.

The external device may be provided as a camera.

In this case, the controller 140 may turn off the sound signal of the external content corresponding to the external device.

However, when the external device exceeds a reference value, the controller 140 may turn on the sound signal of the external content corresponding to the external device when a motion is detected. Detailed descriptions related thereto will be described in detail in the accompanying drawings.

The controller 140 may output the sound signal of an existing content and the sound signal of a new content to the speaker 162 at the predetermined ratio when the priority of the existing content output before the output command is input and the new content output after the output command is input are the same.

According to the embodiment, when the priority is the same, the controller 140 may mainly output the sound signal of the content being output before the split screen output command, and may output a small sound signal of the content output after the split screen output command.

The controller 140 may process image frame data and/or video/audio signals received by the signal receiver 120 and/or the communication interface 130. For example, the controller 140 may output the image frame data received from the signal receiver 120 to the display 150. In addition, the controller 140 may process the video/audio signals received by the signal receiver 120 and/or the communication interface 130, and may output the image frame data generated from the video/audio signals to the display 150.

The controller 140 may control the operations of the signal receiver 120, the display 150, and the sound outputter 160 according to the operation state of the display apparatus 100 and/or a user input. For example, when a content source is selected by a user input, the controller 140 may control the signal receiver 120 to receive image frame data from the selected content source. In addition, when the image frame data is not received through the signal receiver 120, the controller 140 may control the signal receiver 120 to receive image frame data from another content source.

In particular, the controller 140 may output a selection signal for selecting a source from which to receive image frame data to a transmission/reception connector bundle 200 of the signal receiver 120. The controller 140 may include a microprocessor 141 and a memory 142.

The memory 142 may store programs and data for processing image frame data and/or video/audio signals, and may temporarily memorize data generated during processing of the image frame data and/or video/audio signals. In addition, the memory 142 may store programs and data for controlling the components included in the display apparatus 100 and temporarily memorize data generated during the control of the components included in the display apparatus 100.

The memory 142 may include a non-volatile memory for storing data for a long time, such as a read only memory (ROM) and a flash memory, and a volatile memory for temporarily memorizing data, such as a static random access memory (S-RAM), Dynamic Random Access Memory (D-RAM).

The microprocessor 141 may receive image frame data and/or video/audio signals from the signal receiver 120 and/or the communication interface 130. The microprocessor 141 may output the image frame data received from the signal receiver 120 to the display 150 and the sound outputter 160. In addition, the microprocessor 141 may decode the video signal to generate image frame data, decode the audio signal to generate sound data, and output the image frame data and sound data to the display 150 and the sound outputter 160, respectively.

The microprocessor 141 may receive a user input from the user inputter 180, and controls a control signal for controlling the signal receiver 120 and/or the display 150 and/or the sound outputter 160 according to the user input. In addition, the microprocessor 141 may generate a control signal for controlling the operation of the signal receiver 120 according to whether image frame data is received through the signal receiver 120.

The microprocessor 141 may include an arithmetic circuit that performs logical operations and arithmetic operations, and a memory circuit that memorizes calculated data.

The controller 140 may convert sound data decoded from the audio signal into an analog acoustic signal, and an amplifier 161 may amplify the analog sound signal output from the controller 140.

The user inputter 180 may include an input button group 181 that receives a user input.

For example, the user inputter 180 may include a power button for turning on or off the display apparatus 100, a channel selection button for selecting broadcast content displayed on the display apparatus 100, a sound control button for adjusting the volume of the sound output from the display apparatus 100, a source selection button for selecting a content source, and the like.

The input button group 181 may receive respective user inputs and output electrical signals corresponding to the user inputs to the controller 140. The input button group may be implemented using various input devices, such as a push switch, a touch switch, a dial, a slide switch, a toggle switch, and the like.

The tuner 122 may receive a broadcast signal from a broadcast reception antenna or a wired cable, and extract a broadcast signal of a channel selected by a user from among the broadcast signals. For example, the tuner 122 may pass a broadcast signal having a frequency corresponding to a channel selected by a user among a plurality of broadcast signals received through the broadcast reception antenna or the wired cable, and block a broadcast signal having a different frequency.

As such, the signal receiver 120 may receive image frame data and/or video/audio signals through the transmission/reception connector bundle 200 and/or the tuner 122, and output the image frame data and/or video/audio signals received through the transmission/reception connector bundle 200 and/or the tuner 122 to the controller 140.

The communication interface 130 may include a wired communication module 131 and a wireless communication module 132 that may exchange data with external devices.

The communication interface 130 may communicate with at least one other display apparatus 100. Particularly, the communication interface 130 may transmit and receive a location information request signal, location information, blank signal, and layout information with at least one other display apparatus 100.

The wired communication module 131 may be connected to a communication network through a cable and exchange data with an external device through the communication network. For example, the wired communication module 131 is connected to a communication network through Ethernet (Ethernet, IEEE 802.3 technology standard), and exchanges data with first and second image source devices 120 and 130 and/or external devices through the communication network.

The wireless communication module 132 may wirelessly communicate with an access point (AP), and connect to a communication network through the AP and exchange data with the first and second image source devices 120 and 130 and/or the external devices through the communication network. For example, the wireless communication module 132 may communicate with the AP through Wi-Fi (WiFi™, IEEE 802.11 technology standard), Bluetooth (Bluetooth™, IEEE 802.15.1 technology standard), ZigBee™ (IEEE 802.15.4 technology standard). The wireless communication module 132 may exchange data with an external device through the AP.

The communication interface 130 may receive image frame data through the communication network.

The display 150 may include a display panel 152 for visually displaying an image, and a display driver 151 for driving the display panel 152.

The display panel 152 may generate an image according to image data received from the display driver 151 and display the image.

The display panel 152 may include a pixel that serves as a unit for displaying an image. Each pixel may receive an electrical signal representing an image from the display driver 151, and output an optical signal corresponding to the received electrical signal. As such, optical signals output from a plurality of the pixels are combined so that one image may be displayed on the display panel 152.

The display driver 151 may receive image data from the controller 140 and drive the display panel 152 to display an image corresponding to the received image data. Particularly, the display driver 151 may transmit an electrical signal corresponding to image data to each of a plurality of pixels constituting the display panel 152.

When the display driver 151 transmits an electrical signal corresponding to image data to each pixel constituting the display panel 152, each pixel outputs light corresponding to the received electrical signal, and light output from each pixel is combined to form an image.

The sound outputter 160 includes the amplifier 161 for amplifying sound, and the speaker 162 for acoustically outputting the amplified sound.

The speaker 162 may convert the analog acoustic signal amplified by the amplifier 181 into sound (a sound wave). For example, the speaker 182 may include a thin film that vibrates according to an electrical acoustic signal, and sound waves may be generated by the vibration of the thin film.

The speaker 162 may output the sound signal included in the content.

The power supply 170 may supply power to the user inputter 180, the signal receiver 120, the communication interface 130, the controller 140, the display 150, the sound outputter 160, and all other components.

The power supply 170 may include a switching mode power supply 171 (hereinafter, referred to as 'SMPS').

The SMPS 171 may include an AC-DC converter that converts AC power of an external power source into DC power, and a DC-DC converter that changes the voltage of the DC power. For example, AC power of an external power source is converted to DC power by the AC-DC converter, and the voltage of the DC power may be changed to various voltages (for example, 5V and/or 15V) by the DC-DC converter. The DC power with varying voltages may be supplied to the user inputter 180, the signal receiver 120, the controller 140, the display 150, the sound outputter 160, and all other components.

In addition, the transmission/reception connector bundle 200 may include a switch part (not shown) for selecting source of image frame data.

At least one component may be added or omitted to correspond to the performances of the components of the display apparatus illustrated in FIG. 2. In addition, it would be understood by those skilled in the art that the mutual positions of the components may be changed to correspond to the performance or structure of the system.

Meanwhile, the components illustrated in FIG. 2 may refer to a software component and/or a hardware component, such as a Field Programmable Gate Array (FPGA) and an Application Specific Integrated Circuit (ASIC).

Figure 3:
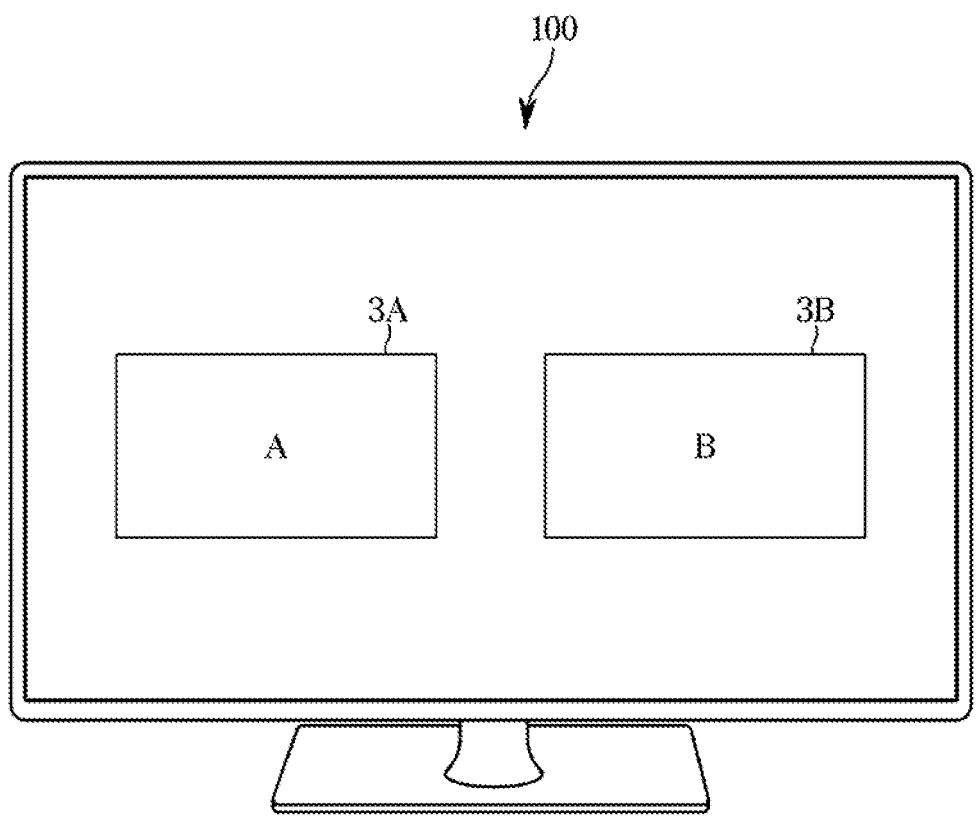
FIG. 3 is a view illustrating an operation of outputting a plurality of contents according to an embodiment.
Figure 4:
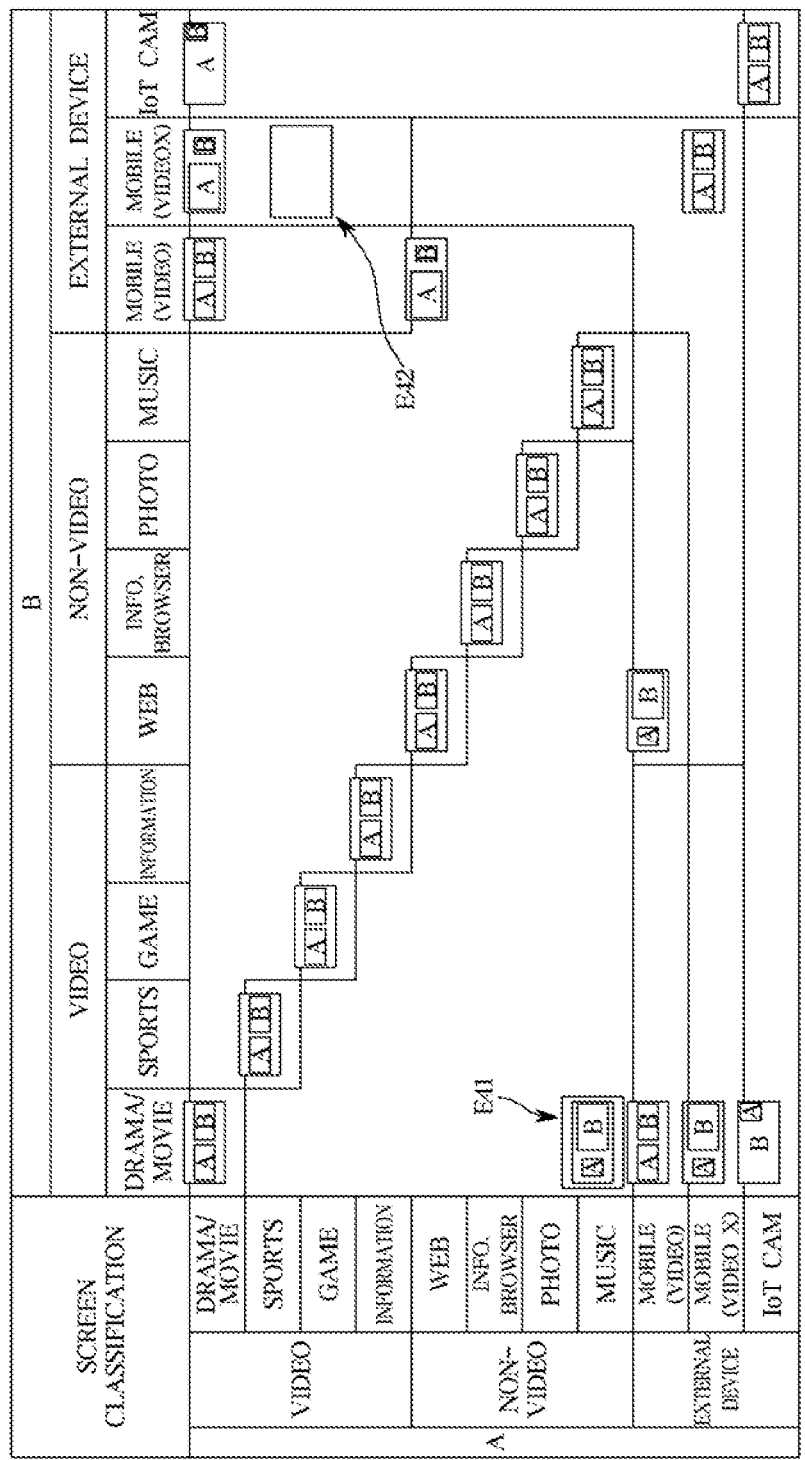
FIGS. 4 and 5 are views for describing a priority of content according to an embodiment.
Figure 5:
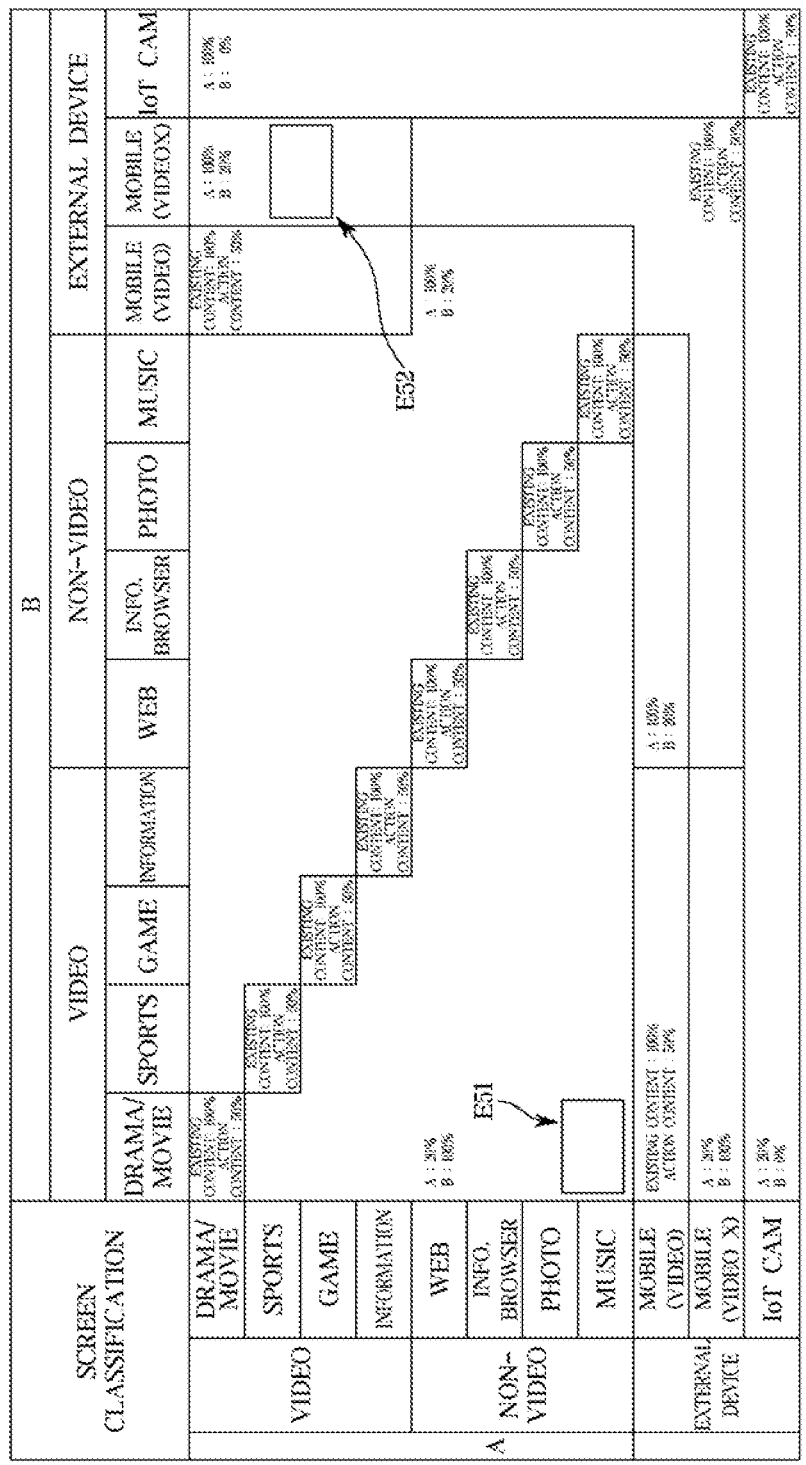

FIG. 3 is a view illustrating an operation of outputting a plurality of contents according to an embodiment, and FIGS. 4 and 5 are views for describing a priority of content according to an embodiment.

Referring to FIG. 3, it illustrates that each content is output in a separate region on one display screen.

Content A and content B may be output to the display apparatus 100.

3A and 3B denotes a region in which the corresponding region content is output. In the embodiment, the content may include "drama/movie", "sports", and "photo".

Meanwhile, referring to FIGS. 3, 4, and 5 together, examples of contents corresponding to contents A and B are illustrated.

Priority information may be determined by various methods.

The priority information may be determined based on the plurality of contents.

In detail, the priority information may be determined based on at least one of types of the plurality of contents and the user's preference for the types of the plurality of contents.

The types of the plurality of contents may refer to a music, the video, and games.

Referring to FIGS. 4 and 5, the drama, the movie, etc., which are contents corresponding to the video, may have priority over the music.

However, the user's preference may be reflected in the type of content.

For example, if the user uses WEB corresponding to the still image more often than the video, the controller 140 may determine the priority information in which WEB has priority over the drama or the movie.

According to another embodiment, the controller 140 may determine the priority information based on genres of the plurality of contents.

Particularly, examples of the genre of content may include entertainment, news, drama, movies, and sports.

FIGS. 4 and 5, the genre of content corresponding to "drama" may have priority over the genre of content corresponding to "sport".

However, the user's preference may be reflected in the genre of the content.

For example, if the user uses the content corresponding to "information" more frequently than the content corresponding to "drama/movie", the controller 140 may determine the priority information in which "information" has priority over the drama or the movie.

According to another embodiment, the controller 140 may determine predetermined priority information based on the user's command input in advance.

That is, the user may directly input the priority separately from the priority information illustrated in FIGS. 4 and 5.

For example, if the user determines "sports" as the highest priority, the controller 140 may determine and output "sports" as the highest priority content even if any other content is output.

According to the embodiment, the controller 140 may store information about the user's content use history.

That is, the controller 140 may determine the predetermined priority information based on information about the stored content usage history.

For example, when the user has continuously viewed a lot of "drama", the controller 140 may assign high priority information to the "drama" and output it with priority over other contents.

Meanwhile, the controller 140 may receive the plurality of contents through a plurality of sources.

The plurality of sources may refer to a TV tuner, a mobile phone, HDMI, contents through a network, contents through USB, and the like.

The priority information of the corresponding source may be determined without limitation, but according to the embodiment, the TV tuner, mobile phone pairing, and the HDMI may have priority over other sources.

Meanwhile, the above-described content is an embodiment of determining the priority information, and the actual priority information may be determined based on various methods. For example, when the content assigned to content A is "music" and the content assigned to content B is "drama", the controller 140 may allocate a wide region to the "drama" based on the priority information and allocate a louder sound output to the "drama" (E41, E51).

When the user listens to music with the display apparatus 100 and outputs the drama using the split screen output command, a volume of the sound signal output of the music may be lowered and the sound signal output of the drama content may be increased.

Particularly, the controller 140 may output the sound signal of the drama five times more than the sound signal of the existing music.

According to another embodiment, when displaying content of a mobile device that does not include "sports" and the dynamic image when outputting the split screen (E42, E52), the controller 140 may output the existing "sports" in a large divided region unless the mobile device includes the video, and may output content of the mobile device including only the static image in the region.

In this case, when the output of the sound signal corresponding to the "sports" content is "100%", the controller 140 may determine and output the sound signal output of the content including the static image of the mobile device as "20%".

Meanwhile, the output form of the split screen illustrated in FIG. 3 is only an embodiment of the disclosure, and the priority information illustrated in FIGS. 4 and 5 is also an the embodiment of the disclosure.

Accordingly, there may be various types of content output on the split screen, and the priority information may be variously changed.

However, in order to describe the operation of the disclosure, it will be described below based on the priority information described in FIGS. 4 and 5.

Figure 6:
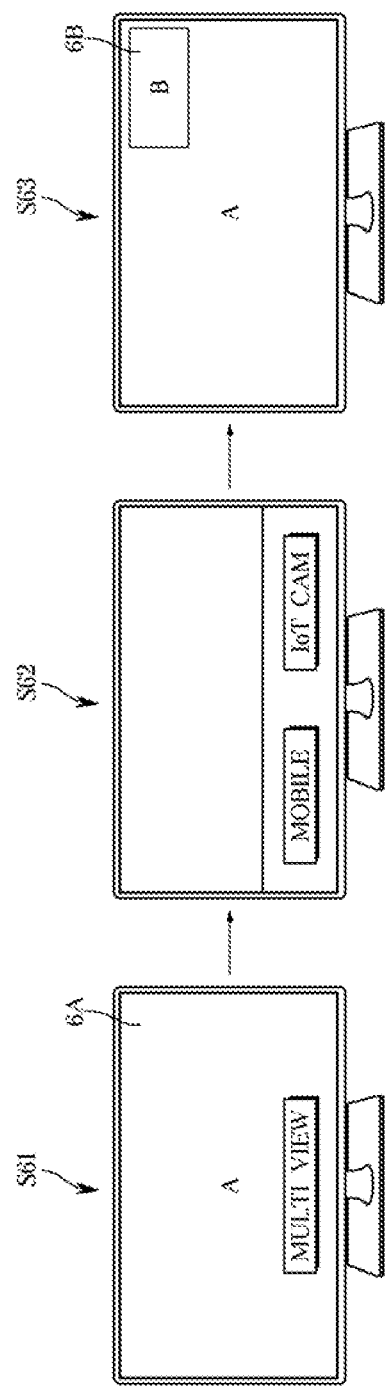
FIG. 6 is a view for describing an output command according to an embodiment.

FIG. 6 is a view for describing an output command according to an embodiment.

Referring to FIG. 6, the user may input the output command to output the plurality of contents on the split screen.

Meanwhile, FIG. 6 illustrates that specific content is being output before the output command is input (S61). The content 6A before the user's output command is input may refer to the existing content. Meanwhile, after the user inputs the output command, the user may select the plurality of contents to be output.

According to the embodiment, the user may select content (IoT Camera) of another external device. In the disclosure, the camera may refer to an IoT camera provided indoors.

When the user inputs the output command and inputs the camera as the new content to be newly input, the controller 140 may output the existing content A (sports) and a new content B (IoT CAM) based on the predetermined priority information (S63).

In FIG. 6, since the user has selected the camera from the existing content, the display apparatus 100 may output the existing content 6A and the content 6B of the external device selected by the user based on the predetermined priority (S63).

Meanwhile, referring to FIGS. 5 and 6, the controller 140 may output the plurality of contents A and B in the size of the region determined based on the priority (S63), and output the sound signal of the corresponding contents based on the priority information. In FIG. 6, the sound signal of content A may be output as 100%, and the sound signal of content B corresponding to IoT CAM may be output as 20%.

Meanwhile, the operation described in FIG. 6 is an embodiment of the disclosure, and there is no limitation on the operation of outputting the plurality of contents to the divided region by the user.

Figure 7:
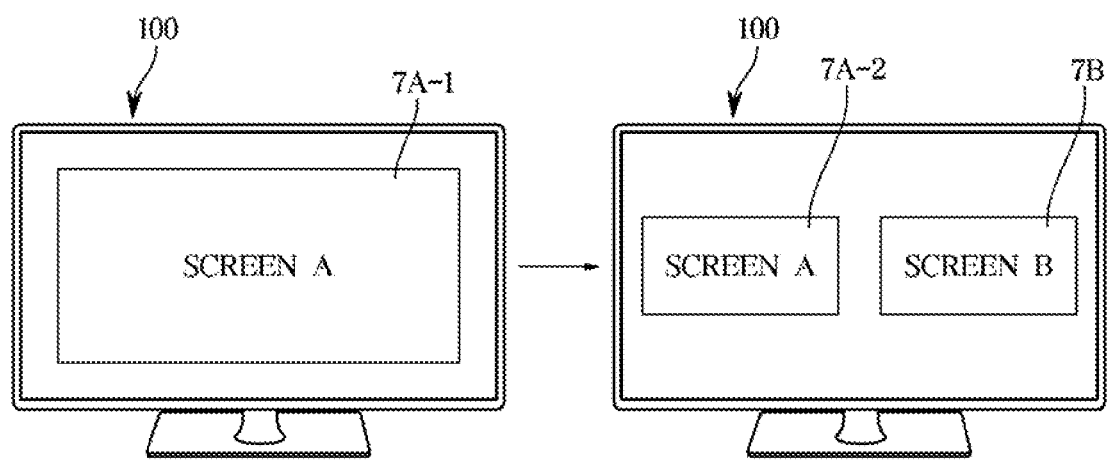
FIGS. 7 and 8 are views for describing an operation of a display apparatus after inputting an output command according to an embodiment.
Figure 8:
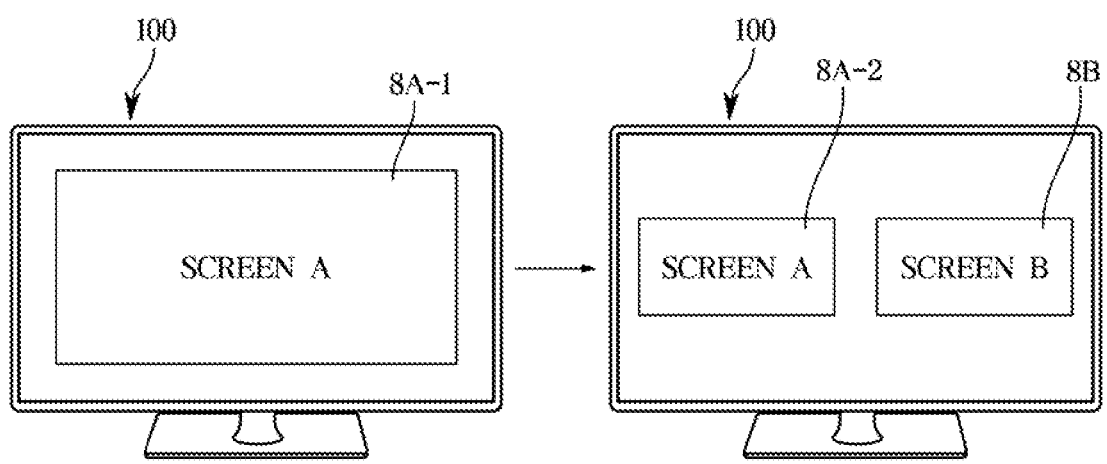

FIGS. 7 and 8 are views for describing an operation of a display apparatus after inputting an output command according to an embodiment.

Referring to FIG. 7, the display apparatus may output the drama content and simultaneously output the drama content 7A-1 and 7A-2 and the news content 7B based on the output command input by the user.

In this case, the plurality of contents are output among one contents. The existing contents may correspond to "dramas 7A-1 and 7A-2" and the new content may correspond to "news 7B".

Meanwhile, referring to FIGS. 4 and 5, "drama" may correspond to content A and "news" may correspond to content B.

The controller 140 may output "drama" to the display 150 in a larger region than "news" based on the predetermined priority.

Also, if the sound signal of the drama is output at 100% intensity based on the predetermined priority, the sound of the news may be output at 20%.

On the other hand, FIG. 8 illustrates an embodiment in which the priority of contents A 8A-1 and 8A-2 and the content B 8B is the same.

Referring to FIG. 8, the content A 8A corresponds to the drama and the content B 8B corresponds to the drama.

The contents A 8A-1 and 8A-2 are the existing contents before the output command is input, and the content B may be output as the new content after the output command is input.

FIG. 8 illustrates that the contents A 8A-1 and 8A-2 is the drama and the content B 8B is also the drama.

In this case, since the same two contents have the same priority, the contents can be output in the region of the same size.

However, in outputting the sound signal, the existing content and the new content may be output based on the priority information.

The priority information may determine in advance a sound output ratio of the existing content and the new content, and according to the embodiment, the controller 140 may output the intensity of the sound signal corresponding to the existing content as twice the sound signal corresponding to the new content.

Meanwhile, the operation described in FIG. 8 illustrates the embodiment of the operation in case of the same priority, and there is no limitation on the type of content or the ratio of the sound signal output.

Figure 9:
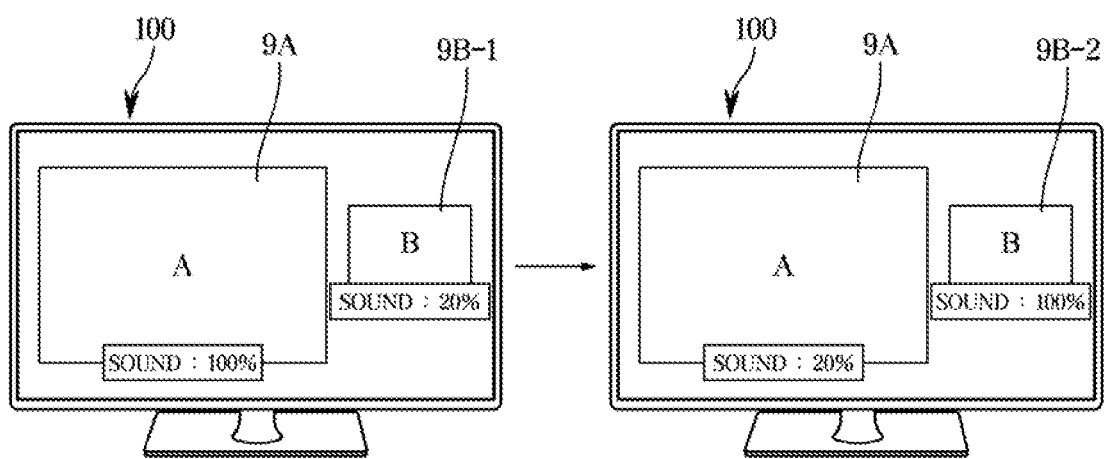
FIG. 9 is a view illustrating an operation of static content and dynamic content according to an embodiment.

FIG. 9 is a view illustrating an operation of static content and dynamic content according to an embodiment.

Referring to FIG. 9, the display apparatus 100 is illustrated to output a drama content 9A and a website content 9B.

The drama may refer to the dynamic content 9A including the dynamic image. Meanwhile, in the case of a website, it may include the dynamic image such as the video or a content 9B-1 including only the static image such as the still image.

Meanwhile, the dynamic content 9A may be output as the sound signal, and the static content 9B-1 may include the sound signal or may have a smaller sound signal than the dynamic content.

Accordingly, the controller may output an output intensity of the sound signal corresponding to the dynamic content greater than the output intensity of the sound signal corresponding to the static content.

According to the embodiment, the controller 140 may output the sound signal corresponding to the drama content at 100% intensity, and may output the sound signal corresponding to the website at 20% intensity.

Meanwhile, the website content illustrated in FIG. 9 may be changed to content including a dynamic image 9B-2.

In the website, data and interfaces for driving the video exist, so the user may change the website to the dynamic content 9B-2 through the control command.

When the static content is converted to another dynamic content 9B-2, the controller 140 may output the output intensity of the sound signal corresponding to the dynamic content and the output intensity of the sound signal corresponding to other dynamic content at the predetermined ratio.

In this case, the website corresponding to other dynamic content may be output with a louder sound signal intensity than that of the sound signal corresponding to the drama content for a predetermined time.

Meanwhile, when the output of the dynamic image included in the website is stopped, the website may be converted back to the static content.

Figure 10:
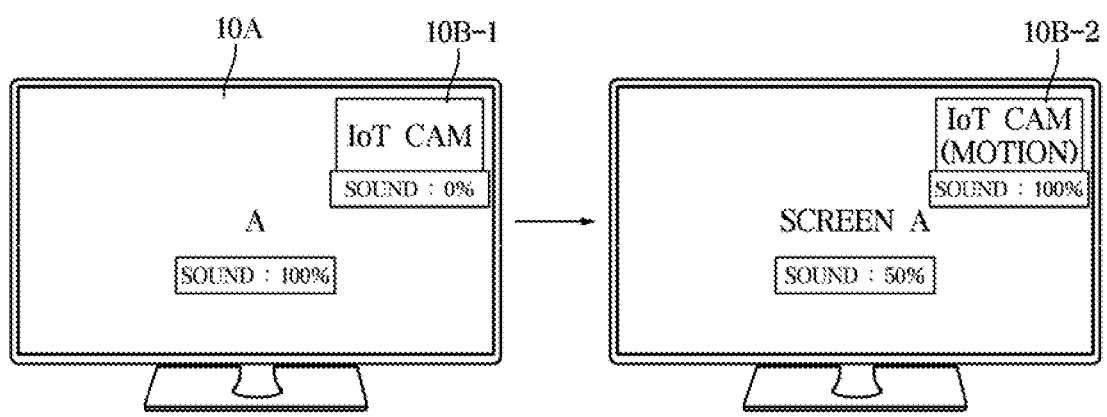
FIG. 10 is a view for describing an output of content corresponding to an external device according to an embodiment.

FIG. 10 is a view for describing an output of content corresponding to an external device according to an embodiment.

Referring to FIG. 10, a content A 10A indicates that the image signal of the drama is output, and a content B 10B-1 indicates that the image signal of the camera is output from the external device.

Referring to FIGS. 4, 5, and 10 together, it illustrates a case where the content A 10A is "drama" and the content B 10B-1 is "IoT CAM". In this case, the controller 140 may display the content A 10A on the full screen and output the content B 10B to a part of the content A 10A.

That is, based on the priority information, the controller 140 may output a larger size of the region of the "drama" content, and may determine a smaller size of the region of content corresponding to "IoT CAM" and output it.

Meanwhile, when the external device is "IoT CAM", the controller 140 may turn off the sound signal of the content corresponding to the external device. However, the controller 140 may obtain the motion of the image based on the change of the image obtained by the external device.

Meanwhile, the controller 140 may output the sound signal of the corresponding "IoT CAM" when an amount of change in the image obtained by the corresponding the external device, that is, the change in motion is greater than a predetermined value (10B-2).

Meanwhile, the priority information and the operation of each display described in FIGS. 3 to 10 are embodiment(s) of the disclosure, and there is no limitation on the operation of the disclosure for outputting the plurality of contents to the plurality of regions.

Figure 11:
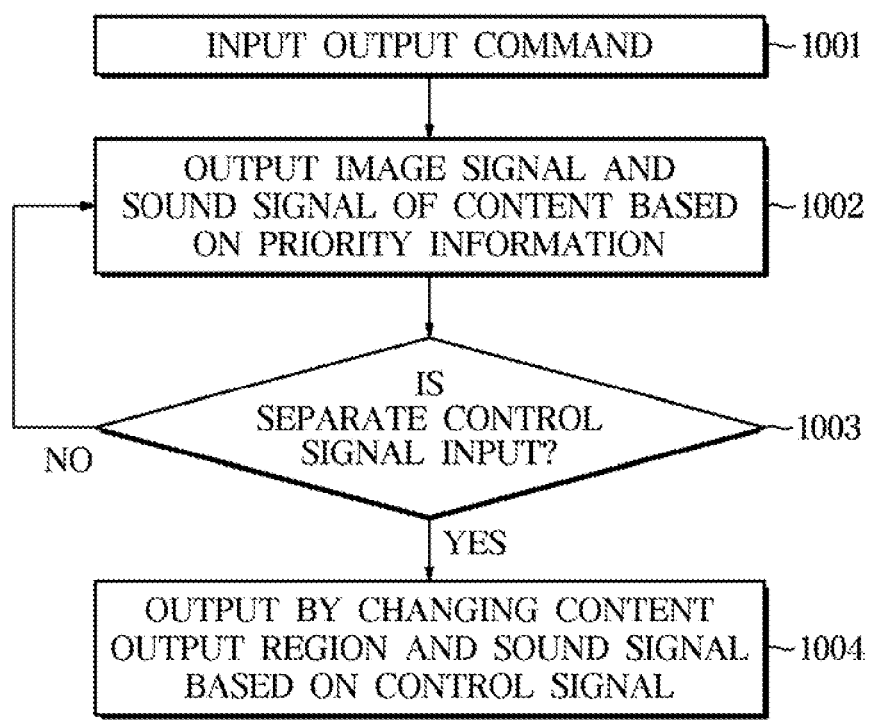

FIG. 11 is a flowchart according to an embodiment.

Referring to FIG. 11, the user may input the output command for outputting the plurality of contents to the display apparatus 100 (1001).

The controller 140 may determine and output the size of the region for outputting the image signal of the content and the sound signal of the content based on the previously stored priority information (1002).

In addition, when a separate control signal from the user is input (1003), the size of the region in which the content is output and the sound signal of the content may be changed and output based on the control signal (1004).

FIG. 12 is a flowchart illustrating the operation when the dynamic content and the static content are output according to an embodiment.

When the user inputs the output command (1011) and the content to be output is the static content and the dynamic content (1012), the controller 140 may output the sound signal intensity of the dynamic content greater than that of the static content (1013).

On the other hand, when the static content is changed to the dynamic content (1014), the controller 140 may increase the intensity of the sound signal of the changed dynamic content to output the output intensity of the sound signal corresponding to the dynamic content and the sound signal corresponding to other dynamic content at the predetermined ratio (1015).

According to the display apparatus and the method of controlling the display apparatus according to the embodiments, it is possible to increase user convenience by outputting the screen and the sound under predetermined conditions when outputting the split screen.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A display apparatus comprising:
a speaker;
a display; and
a controller configured to:
in response to input of an output command for outputting a first content and a second content to a first region and a second region of the display, respectively, control the display to output image signals of the first content and the second content to the first region and the second region,
in response to the first content being a dynamic content and the second content being a static content, control the speaker to output a first sound corresponding to the first content at a first level, and control the speaker to output a second sound corresponding to the second content at a second level, and
wherein an output intensity of a sound signal corresponding to the first level is greater than an output intensity of a sound signal corresponding to the second level.

2. The display apparatus according to claim 1, wherein the controller controls sizes of the first region and the second region in which the first content and the second content are displayed by the display and controls a respective output intensity of the sound signals by the speaker according to predetermined priority information designated in association with the first content and the second content prior to receipt of the input of the output command.

3. The display apparatus according to claim 2, wherein the controller is configured to determine the predetermined priority information based on at least one of genres of the first content and the second content, a type of the first content and a type of the second content and a user's preference for the type of the first content and the type of the second content.

4. The display apparatus according to claim 2, wherein the controller is configured to determine the predetermined priority information based on a pre-input user's command.

5. The display apparatus according to claim 2, wherein the controller is configured to store information about a user's content usage history, and to determine the predetermined priority information based on the information about the content usage history.

6. The display apparatus according to claim 2, wherein the controller is configured to receive the first content and the second content through a plurality of sources, and to determine the predetermined priority information based on the plurality of sources.

7. The display apparatus according to claim 2, wherein, after the input of the output command, the controller is configured to change the sizes of the first region and the second region according to which the first content and the second content are output based on a control command for changing the sizes of the first region and the second region.

8. The display apparatus according to claim 2, wherein, after the input of the output command, the controller is configured to change the respective output intensity of the sound signals according to which the first content and the second content are output based on a control command for changing the respective output intensity of a respective sound signal.

9. The display apparatus according to claim 2, wherein the controller is configured to:
receive an external content from an external device;
determine a size of a region in which the external content is output based on a priority determined corresponding to the external device and output the external content to the display; and
output a sound signal of the external content to the speaker based on a priority determined in correspondence with the external device.

10. The display apparatus according to claim 9, wherein:
the external device is provided as a camera; and
the controller is configured to turn off the sound signal of the external content corresponding to the external device.

11. The display apparatus according to claim 10, wherein the controller is configured to turn on the sound signal of the external content corresponding to the external device in response to the external device detecting a motion exceeding a reference value.

12. The display apparatus according to claim 2, wherein, in response to a priority of an existing content output before the output command is input and a new content output after the output command is input are the same, the controller is configured to output a sound signal of the existing content and a sound signal of the new content to the speaker at a predetermined ratio.

13. The display apparatus according to claim 1, wherein the controller is configured to change the respective output intensity of a respective sound signal of a content among the first content and the second content based on a respective size of the first region and the second region.

14. The display apparatus according to claim 1, wherein, in response to the static content being converted to another dynamic content, the controller is configured to control the speaker to output a third sound corresponding to another dynamic content at a third level, and control the speaker to output a fourth sound corresponding to the dynamic content at a fourth level, wherein an output intensity of a sound signal corresponding to the third level is greater than the output intensity of the sound signal corresponding to the second level, and an output intensity of a sound signal corresponding to the fourth level is less than the output intensity of the sound signal corresponding to the first level.

15. The display apparatus according to claim 1, further comprising:
a tuner configured to receive a broadcast signal, and
a source configured to receive a content from at least one of a mobile phone, HDMI, a network, and USB,
wherein the first content includes the broadcast signal received by the tuner, and the second content includes the content received by the source.

16. A method of controlling a display apparatus comprising:
in response to input of an output command for outputting a first content and a second content to a first region and a second region of a display, respectively, controlling, by a controller, the display to output image signals of the first content and the second content to the first region and the second region; and
in response to the first content being a dynamic content and the second content being a static content, controlling, by the controller, a speaker to output a first sound corresponding to the first content at a first level, and controlling, by the controller, the speaker to output a second sound corresponding to the second content at a second level,
wherein an output intensity of a sound signal corresponding to the first level is greater than an output intensity of a sound signal corresponding to the second level.

17. The method according to claim 16, further comprising:
controlling sizes of the first region and the second region in which the first content and the second content are displayed by the display and controlling a respective output intensity of the sound signals by the speaker according to which the first content and the second content are output in the first region and the second region are based on predetermined priority information designated in association with the first content and the second content prior to receipt of the input of the output command.

18. The method according to claim 17, wherein determining of the predetermined priority information comprises:
determining the predetermined priority information based on at least one of genres of the first content and the second content, a type of the first content and a type of the second content and a user's preference for the type of the first content and the type of the second content.

19. The method according to claim 17, wherein determining of the predetermined priority information comprises:
determining the predetermined priority information based on a pre-input user's command.

20. The method according to claim 17, wherein determining of the predetermined priority information comprises:
storing information about a user's content usage history; and
determining the predetermined priority information based on the information about the content usage history.

21. The method according to claim 17, wherein determining of the predetermined priority information comprises:
receiving the first content and the second content through a plurality of sources; and
determining the predetermined priority information based on the plurality of sources.

22. The method according to claim 17, further comprising:
after the input of the output command, changing, by the controller, the sizes of the first region and the second region according to which the first content and the second content are output based on a control command for changing the sizes of the first region and the second region.

23. The method according to claim 17, further comprising:
after the input of the output command, changing, by the controller, the respective output intensity of the sound signals according to which the first content and the second content are output based on a control command for changing the respective output intensity of a sound signal.

24. The method according to claim 17, further comprising:
changing, by the controller, the respective output intensity of a respective sound signal of a content among the first content and the second content based on a respective size of the first region and the second region.

25. The method according to claim 17, further comprising:
receiving, by the controller, an external content from an external device;
determining, by the controller, a size of a region in which the external content is output based on a priority determined corresponding to the external device and output the external content to the display; and
outputting, by the controller, a sound signal of the external content to the speaker based on a priority determined in correspondence with the external device.

26. The method according to claim 25, wherein:
the external device is provided as a camera; and
the outputting of the sound signal of the external content to the speaker comprises:
turning off the sound signal of the external content corresponding to the external device.

27. The method according to claim 26, wherein the outputting of the sound signal of the external content to the speaker comprises:
turning on the sound signal of the external content corresponding to the external device in response to the external device detecting a motion exceeding a reference value.

28. The method according to claim 17, further comprising:
in response to a priority of an existing content output before the output command is input and a new content output after the output command is input are the same, outputting, by the controller, a sound signal of the existing content and a sound signal of the new content to the speaker at a predetermined ratio.

29. The method according to claim 16, further comprising:
in response to the static content being converted to another dynamic content, controlling, by the controller, the speaker to output a third sound corresponding to another dynamic content at a third level, and controlling the speaker to output a fourth sound corresponding to the dynamic content at a fourth level, wherein an output intensity of a sound signal corresponding to the third level is greater than the output intensity of the sound signal corresponding to the second level, and an output intensity of a sound signal corresponding to the fourth level is less than the output intensity of the sound signal corresponding to the first level.

\* \* \* \* \*